Patented July 24, 1934

1,967,871

UNITED STATES PATENT OFFICE 1,967,871

MEANS AND METHOD OF DETECTING LEAKS IN REFRIGERATING SYSTEMS

Christian Dantsizen, Schenectady, N. Y., assignor to General Electric Company, a corporation of New York No Drawing. Application June 15, 1931, Serial No. 544,693

8 Claims. (Cl. 252—5)

The present invention relates to a method of detecting leaks in refrigerating systems and particularly such systems as are used in domestic refrigeration.

Electric refrigeration for domestic use has become widespread in recent years. Among refrigerating systems used at present are those in which relatively toxic refrigerants are employed. In case of a leak in the system it is often very difficult to locate the particular place where leakage is occurring, especially if the leak is a small one. In addition, the refrigerant is sometimes odorless and colorless making it impossible to know that there is a leak in the system until, possibly injurious results have taken place.

It is therefore a principal object of by invention to provide means whereby leaks in refrigerating systems may be easily and conveniently detected and located so that they can be repaired without undue delay and before enough refrigerant has escaped to do any serious harm.

A further object of my invention is to provide the refrigerant with a substance which on escape into the atmosphere from the system provides visible means so that it is easy to observe the leak immediately and know the source thereof.

Other and further objects of my invention will be more apparent as the description thereof proceeds.

In accordance with my invention, to the refrigerant employed in the system, for example, methyl chloride, difluor dichlor methane and the like, a relatively small quantity of a substance is added, which, when in contact with the atmosphere, produces visible effects, as for example, a cloud of smoke or fumes. Examples of such substances which may be employed are boron trichloride, silicon tetrachloride and titanium tetrachloride.

I prefer at present to employ boron trichloride as the indicator in the refrigerant. This substance is itself admirably suited as a refrigerant. Hence, its addition to the refrigerant employed in the system produces no deleterious effects on the refrigerant but is in fact helpful. The amount of boron trichloride which may be used in conjunction with the refrigerant is variable. Ordinarily not more than a few percent, for example, 5% of the indicator need be used.

What I claim as new and desire to secure by Letters Patent of the United States, is,—

1. The method of detecting leaks in refrigerating systems employing a relatively anhydrous refrigerant which comprises circulating through the system with the refrigerant a substance which when in contact with the atmosphere reacts with the moisture therein to give visible fumes.

2. The method of detecting leaks in refrigerating systems employing a relatively anhydrous refrigerant which comprises circulating through the system with the refrigerant a small amount of a substance of the group consisting of boron trichloride, silicon tetrachloride and titanium tetrachloride.

3. The method of detecting leaks in refrigerating systems employing a relatively anhydrous refrigerant which comprises circulating through the system with the refrigerant a small amount of boron trichloride.

4. In combination, a relatively anhydrous refrigerant and a leak detecting means, said means when in contact with the atmosphere reacts with the moisture therein to give visible fumes.

5. In combination, a relatively anhydrous refrigerant and a leak detecting means, said means being of the class consisting of boron trichloride, silicon tetrachloride and titanium tetrachloride.

6. In combination, a relatively anhydrous refrigerant and a leak detecting means, said means consisting of boron trichloride.

7. In combination, difluor dichlormethane and a relatively small amount of boron trichloride.

8. In combination, a relatively anhydrous refrigerant and about 5% of a substance associated therewith which fumes visibly in the presence of atmospheric moisture.

CHRISTIAN DANTSIZEN.